United States Patent
Burt et al.

[11] Patent Number: 5,871,315
[45] Date of Patent: Feb. 16, 1999

[54] TOMBSTONE FIXTURE

[75] Inventors: Dennis A. Burt, Springboro; Paul E. McCalmont, Cincinnati, both of Ohio

[73] Assignee: Unova IP Corp., Beverly Hills, Calif.

[21] Appl. No.: 996,245

[22] Filed: Dec. 22, 1997

[51] Int. Cl.[6] .................................................. B23Q 3/02
[52] U.S. Cl. .......................... 409/225; 269/900; 409/219
[58] Field of Search .................................. 409/141, 221, 409/219, 225, 224; 29/33 P, 56.6, 56.5; 269/224, 228, 310, 900, 902, 305; 198/346.1, 345.3

[56] References Cited

U.S. PATENT DOCUMENTS

| | | | |
|---|---|---|---|
| 2,714,823 | 8/1955 | Dall et al. | 74/574 |
| 3,447,402 | 6/1969 | Ray | 77/58 |
| 3,522,864 | 8/1970 | Richter | 188/1 |
| 3,790,153 | 2/1974 | Seidenfaden | 269/21 |
| 4,438,599 | 3/1984 | Kamman et al. | 51/238 |
| 4,468,019 | 8/1984 | Staudenmaier | 269/56 |
| 4,512,068 | 4/1985 | Piotrowski | 29/33 |
| 4,630,811 | 12/1986 | Rudisill | 269/305 X |
| 4,669,227 | 6/1987 | Treppner | 269/902 X |
| 4,921,378 | 5/1990 | Kytölä | 409/221 |
| 5,033,340 | 7/1991 | Siefring | 82/158 |
| 5,058,261 | 10/1991 | Kitamura | 29/568 |
| 5,243,745 | 9/1993 | Varnau | 29/33 P |
| 5,454,148 | 10/1995 | Ewer et al. | 29/33 |
| 5,494,269 | 2/1996 | McCalmont | 269/224 |
| 5,549,190 | 8/1996 | Turchan | 198/403 |
| 5,582,396 | 12/1996 | Brasca et al. | 269/900 X |

FOREIGN PATENT DOCUMENTS

| | | | |
|---|---|---|---|
| 115491 | 9/1979 | Japan | 409/219 |
| 97825 | 6/1984 | Japan | 409/225 |
| 1134345 | 1/1985 | U.S.S.R. | 409/225 |

OTHER PUBLICATIONS

Cincinnati Milacron Marketing Company "Wolf Tracks" publication, vol. 4, No. 1/1997; photo of tombstone fixture at p. 26.

Cincinnati Milacron Marketing Company, "T–Line" publication No. M–5264–4, Jul. 1990; photos of fixtured pallets at pp. 6,7 and T–10 machining center at pp. 2,8.

Advanced Machine & Engineering Co. "Precision Components for Industry" brochure, No. PDF–9505, May, 1990; photo of AMFLEX Self–Aligning Fixture Elements showing large tombstone fixtures.

*Primary Examiner*—William R. Briggs
*Attorney, Agent, or Firm*—Thomas M. Farrell

[57] ABSTRACT

A tombstone fixture for supporting workpieces has a stiffened tooling column.

10 Claims, 3 Drawing Sheets

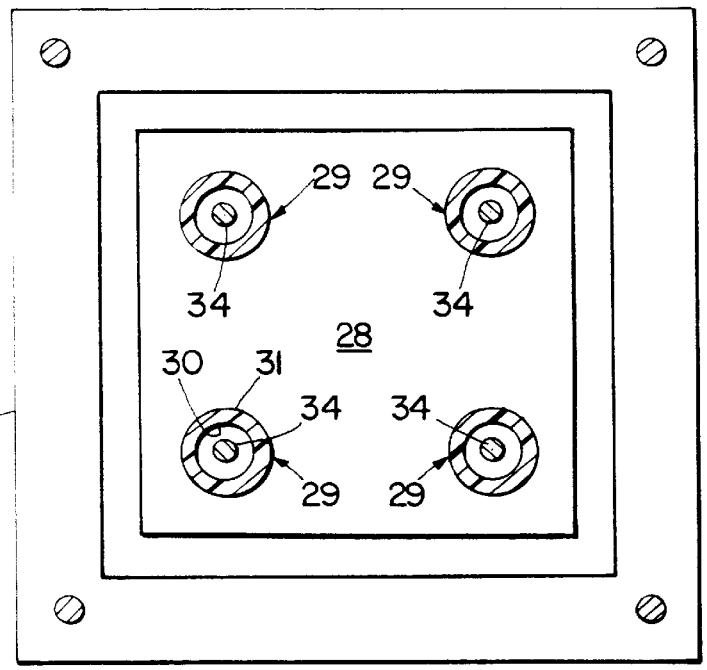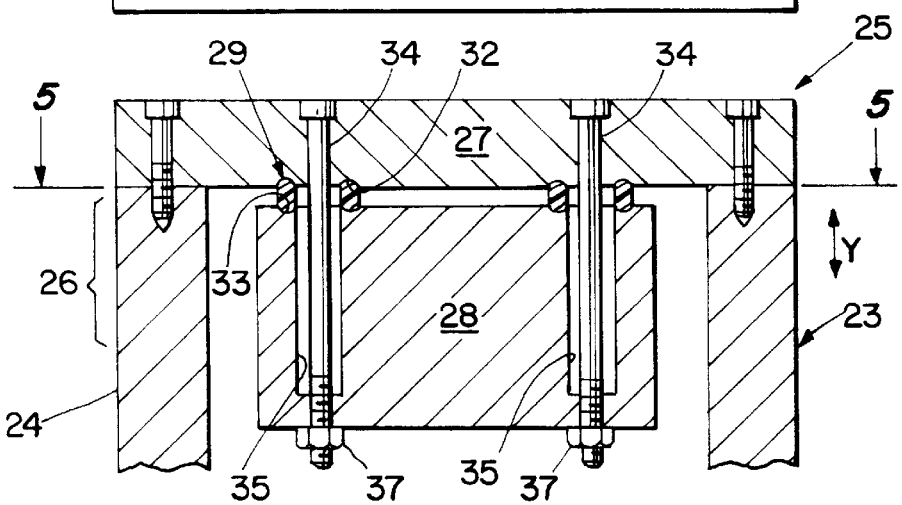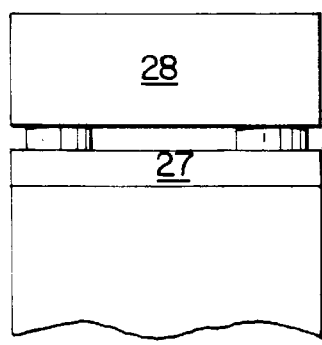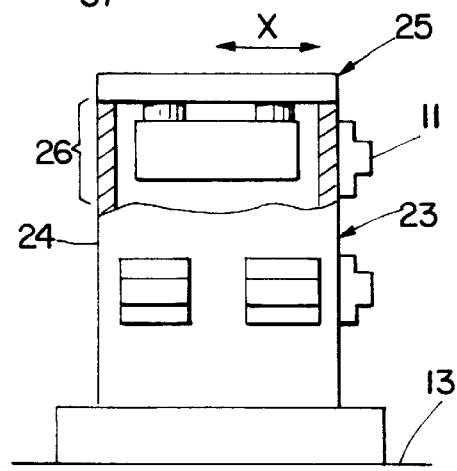

5,871,315

TOMBSTONE FIXTURE

FIELD OF INVENTION

This invention relates to workpiece supports. In particular, the invention relates to tombstone fixtures, or tooling columns, typically used for supporting a plurality of workpieces for machining operations.

BACKGROUND OF THE INVENTION

Tombstone fixtures are widely used for supporting one or more workpieces clamped against faces of the fixture, while the workpieces are machined. This basic fixture generally comprises a tooling column rising from a fixture base, and the base is adapted to fit a machine support surface, such as a machining center table. In many production environments, the fixtures are affixed to the top surface of interchangeable machine pallets which have common registration and clamping surfaces mated to master machine registration and clamping surfaces. Also, the fixtures are often provided with permanent locating and clamping hardware, and are said to be "dedicated" to the production of a specific part. Several examples of prior art tombstone fixture configurations are depicted in FIGS. 1a–d, herein. FIGS. 1a and 1b are four-sided fixtures, with FIG. 1a being solid, and FIG. 1b being hollow. FIGS. 1c and 1d are T-type fixtures, each resembling an inverted T, with FIG. 1c being solid, and FIG. 1d being "windowed" by a through aperture. An example of a tombstone fixture fully rigged with clamping and locating hardware for supporting a plurality of workpieces during machining operations is shown in U.S. Pat. No. 5,454,148, of G. A. Ewer, et al, issued Oct. 3, 1995, entitled Tombstone Fixture. Further examples of tombstone fixtures are shown in U.S. Pat. No. 3,790,153, of H. Seidenfaden, issued Feb. 5, 1974, entitled Equipment for Holding Workpieces, and U.S. Pat. No. 4,630,811, of C. D. Rudisill, issued Dec. 23, 1986, entitled Modular Fixturing Apparatus. Examples of interchangeable machine pallets are shown in U.S. Pat. No. 4,468,019, of S. Staudenmaier, issued Aug. 28, 1984, entitled Pallet Clamping System for Machine Tools, and U.S. Pat. No. 4,512,068, of T. W. Piotrowski, issued Apr. 23, 1985, entitled Pallet Receiver with Compliant Pin and Socket Registration.

In machines for performing operations on a workpiece, especially those operations where stock is removed from the workpiece, vibrations are frequently generated. One such machine for removing stock is a CNC machining center, which is a machine for milling, drilling, etc., in an automatic cycle, and with automatically interchangeable tools (e.g., see U.S. Pat. No. 4,512,068, above). Tuned damped absorbers, often referred simply as "dampers", comprise a body of art for introducing structural damping where desired. But dampers are typically applied in structural locations not subject to changes which would effect frequency response. Thus, dampers have not, traditionally, been applied to the workpiece fixture side of a machining center, for example, because of the potential changes in mass of the different workpieces which are machined.

With regard to machine tool subassemblies, a prior art damper has been applied to the wheelhead of a grinding machine; such damper is found in U.S. Pat. No. 3, 522,864, of R. C. Richter, issued Aug. 4, 1970, entitled Tuned Vibration Damper Assembly for Machine Tools. In this Patent, a wheelhead is rockable about a pivot point, and a tuned damper is mounted to an angled face of the wheelhead. The damper comprises a damping mass, a resilient member between the wheelhead and damper mass, and a bolt and spring combination for securing the mass to the wheelhead face in a manner preloading the resilient member. The resilient member acts in shear along the angled face, providing components of shear damping in the X and Y direction, which counteract moments of vibration about the pivot point.

With regard to the "cutter side" of a machine, i.e., as opposed to the workpiece fixture side of the machine, a rotary damper has been applied to the cutter arbor of a horizontal milling machine. This damper is depicted in U.S. Pat. No. 2,714, 823, of A. H. Dahl et al., issued Aug. 9, 1955, entitled Vibration Damper.

Damping has also been applied to a boring bar support of a turning machine, as shown in U.S. Pat. No. 5,033,340, of L. T. Siefring, issued Jul. 23, 1991, entitled Apparatus and Method for Tool Vibration Damping.

It is also known to place a damper inside a boring bar which supports a cutter. U.S. Pat. No. 3,447,402, of J. C. Ray, issued Oct. 25, 1967, entitled Damped Tuned Boring Bar, shows such a structure.

With regard to the "workpiece side" of a machine tool, an example of a vibration damping apparatus applied directly against a stationary workpiece is shown in U.S. Pat. No. 5,494,269, of P. E. McCalmont, issued Feb. 27, 1996, entitled Vibration Damper. In this structure, a damping unit is mounted to a machine table and is manually actuated to load a damping head against an otherwise unsupported cantilevered workpiece portion; the damping head is retracted when the workpiece is to be removed from the machine.

Another a workpiece damper is depicted in U.S. Pat. No. 4,438,599, of J. T. Kamman et al., issued Mar. 27, 1984, entitled Vibration Damper for Machine-Carried Workpiece. In this patent, a shoe held in a shoe holder by viscoelastic pads is applied directly against a slender rotating workpiece, to attenuate workpiece vibrations.

The present invention is applicable to the workpiece side of a machine tool, and is particularly pertinent to those situations where the workpiece mass comprises a small percentage of total mass of fixture and workpiece, and where the change in total mass as the workpiece is machined, is also small. The invention obviates many of the difficulties inherent in the prior art devices, by incorporating a tuned damper into a tombstone fixture for supporting workpieces.

SUMMARY OF THE INVENTION

An object of the present invention is to provide a workpiece support structure which will tend to achieve performance enhancement without comprising a machine's original operating work zone.

Another object of the present invention is to provide a tombstone fixture having a damper which can be tuned for a large range of frequencies to improve performance capability on the workpiece side of a machine.

Still another object of the present invention is to provide enhanced vibrational energy absorption to dedicated workpiece support fixtures.

The invention is shown embodied in a tombstone fixture, for use in a machine for performing operations on a workpiece, comprising: a tooling column having a plurality of sides extending from a bottom portion to a top portion; means for mounting and securing the bottom portion to a machine tool support member; means for mounting a workpiece to at least one of the tooling column sides; and damper means secured to the tooling column for attenuating vibrations resulting from an operation performed on the workpiece.

In one aspect of the invention, the tombstone fixture comprises a hollow vertical tooling column where the damper means secured to the hollow tooling column extends at least partially within the top portion.

In another aspect of the invention, the damper means comprises: a damper base secured to the tooling column; a damper mass; at least one viscoelastic absorber element interposed between the damper base and the damper mass; and resilient means for preloading the viscoelastic absorber element and mounting the damper mass in relation to the damper base and tooling column.

BRIEF DESCRIPTION OF THE DRAWINGS

FIG. 3 is an elevational view, in partial section, of the preferred embodiment, showing a tombstone fixture secured to an interchangeable work support pallet, the tombstone fixture including a special damping unit.

FIG. 4 is an enlarged elevational section showing the top portion of the tombstone fixture of FIG. 3.

FIG. 5 is a plan section, taken along the line 5—5 of FIG. 4.

FIG. 6 is an elevational view of an alternative embodiment of the invention, depicting the elements of FIG. 4 in the inverted position, resulting in an overhead damper mass.

DESCRIPTION OF THE INVENTION

It should be noted that certain attitudinal references contained herein, for example, "vertical", and "horizontal", are made for the purpose of illustrating the preferred embodiment; the invention is not to be limited by these references and will find application in many spatial orientations.

Figure 2:
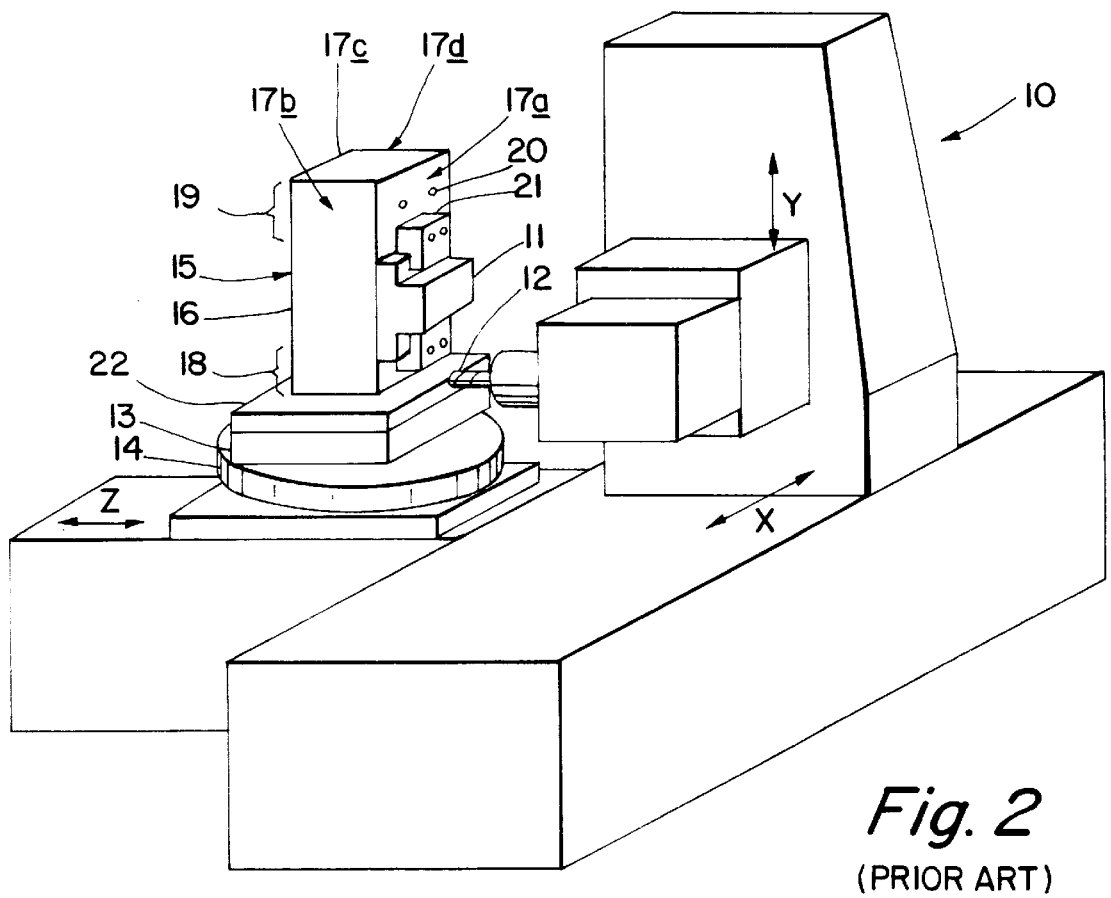
FIG. 2 is a perspective view, showing a machining center having a tombstone fixture secured to an interchangeable work support pallet.

FIG. 2 of the drawings simulates a metal cutting machine 10 such as the T-10 horizontal machining center, produced by Cincinnati Milacron Inc., assignee of the present invention; the invention is equally applicable to other machines, including the MAXIM® horizontal machining center (not shown), also produced by Cincinnati Milacron Inc. The machine 10 is capable of providing discrete relative movements between a workpiece 11 and a cutter 12, along three mutually perpendicular coordinates, X,Y, and Z; in this machine 10, ordinates X and Z lie in a horizontal plane. Through simultaneous controlled movements along combinations of the coordinates, infinite vectors of relative motion between a workpiece 11 and a cutter 12 may be achieved. The machine includes a pallet 13 which is removably attached to the machine 10 and a machine table 14 which, together, form a common machine tool support member for supporting a tombstone fixture 15 and at least one workpiece 11. The machine has a rotary cutter 12 which is applied periodically to the workpiece 11 to remove metal during an automatic operation. The tombstone fixture 15 constitutes a tooling column 16, having a plurality of sides 17a,b,c,d extending upwardly from a bottom portion 18 to a top portion 19. The tombstone fixture 15 has a plurality of mounting holes 20 and clamps 21 located on at least one of its sides 17a, as a means for mounting and securing the workpiece 11. The top portion 19 of the fixture 15 is free and the bottom portion 18 is surrounded by an integral flanged base 22 which provides a means for mounting and securing the fixture 15 to the pallet 13, i.e., to the machine tool support member. Since the fixture 15 is secured to the machine 10 only at its flanged base 22, the top portion 19 is likely to see principal vibratory motion, along a substantially horizontal plane.

Figures 1A, 1B, 1C, 1D:
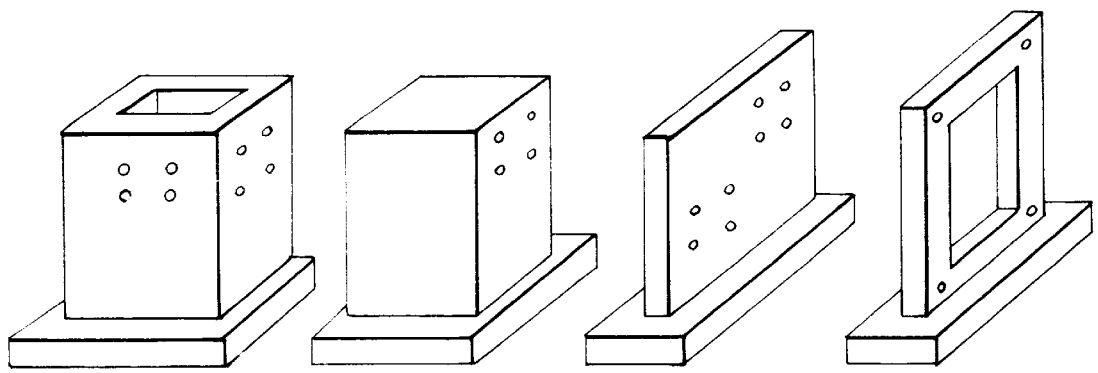
FIG. 1a shows a solid tombstone fixture.
FIG. 1b shows a hollow tombstone fixture.
FIG. 1c shows a T-type fixture.
FIG. 1d shows a windowed T-type fixture.

FIG. 3 is an elevational view of an improved tombstone fixture 23 of the type generally depicted in FIG. 1, wherein the vertical tooling column 24 is hollow. A damper means 25 is secured to the top portion 25 of the hollow tooling column 24, and the damper means 25 extends at least partially within the top portion 26, for attenuating vibrations resulting from a force-producing metal removal operation on the workpiece 11.

The elevational section of FIG. 4 and plan section of 5 are enlarged views showing more details of the sectioned portion of FIG. 3. The damper means 25 is a tuned damper, which includes a stiff, plate-like damper base 27 secured to the top portion 26 of the tooling column 24, and the damper base 28, in turn, supports a depending damper mass. In effect, the damper base simply comprises an integral portion of the tooling column. The damper mass is, preferably, a substantially solid, heavy block of metal, such as lead or steel, and is sometimes referred-to as an "inertia block", because of its tendency to resist movement with the structure to be damped. A plurality of viscoelastic damping elements 29 are located between the damper base 27 and damper mass 28, and the damping elements 29 are compressibly preloaded in the Y direction. Thus loaded, the viscoelastic damping elements 29 will tend to act in shear in the X direction, i.e., along a horizontal plane, when the damper means 25 is absorbing vibrations.

The damping element 29 is formed of any of a number of viscoelastic materials, e.g., polyurethane, preferably molded into the general shape of a torus modified with cylindrical inner and outer diameters 30,31, and the element 29 is facially seated in mating annular 32,33 grooves formed in both the damper base 27 and the damper mass 28, respectively, to prevent sliding. It may be noted that, although the preferred embodiment has a plurality of four damping elements 29, it will be readily appreciated by those skilled in the art that a single damping element 29 may be employed, and the exact shape of the element 29 may be varied from the ring-like form shown, to other shapes, including solid square pads, for example. An important aspect of the preferred embodiment is that the damping element 29 is compressibly preloaded between the mass 28 and damper base 27, in the vertical direction, and is permitted to operate principally in shear, normal to preload, along a generally horizontal plane. It will also be appreciated by those skilled in the art that, although the principal damping properties are manifested through the agency of shear, the viscoelastic damping element 29 also possesses an inherent ability to somewhat damp vibratory movements between the base 27 and mass 28 in directions transverse to shear; for example, in the Y direction. The damper mass 28 and base 27 are pulled together against four damping elements 29 by means of four long, thin screws 34 extending from the top of the base 27, centrally through the elements 29, and through the mass 28. The damper mass 28 has four deep counterbores 35 running from its topmost end 36, to provide substantial clearance around the body of the thin screws 34, and the mass 28 is secured by lock nuts 37, at the bottom of the screws 34. Because of its inherent spring rate in the axial direction, each screw 34, when axially loaded by its lock nut 37, behaves as a loaded extension spring, to accomplish compressive loading of the damping element 29. Because the slender screw 34 can flex within its counterbore 35, the damper mass 28 may move relative to the damper base 27 in the horizontal, X direction, i.e., radially of the screw 33.

Further details of similar damping elements and grooves, together with other, optional, preloading spring arrangements, and load-limiting stop collars, are found in U.S. Pat. No. 3,522,864, mentioned in the Background portion of this specification, the disclosure of which patent is incorporated herein by reference. The selection of components forming a tuned damper, as well as determination of preloading levels for the resilient elements 29, are deemed to be options well within the ken of damper designers, and will not be separately discussed.

Figures 7, 8:
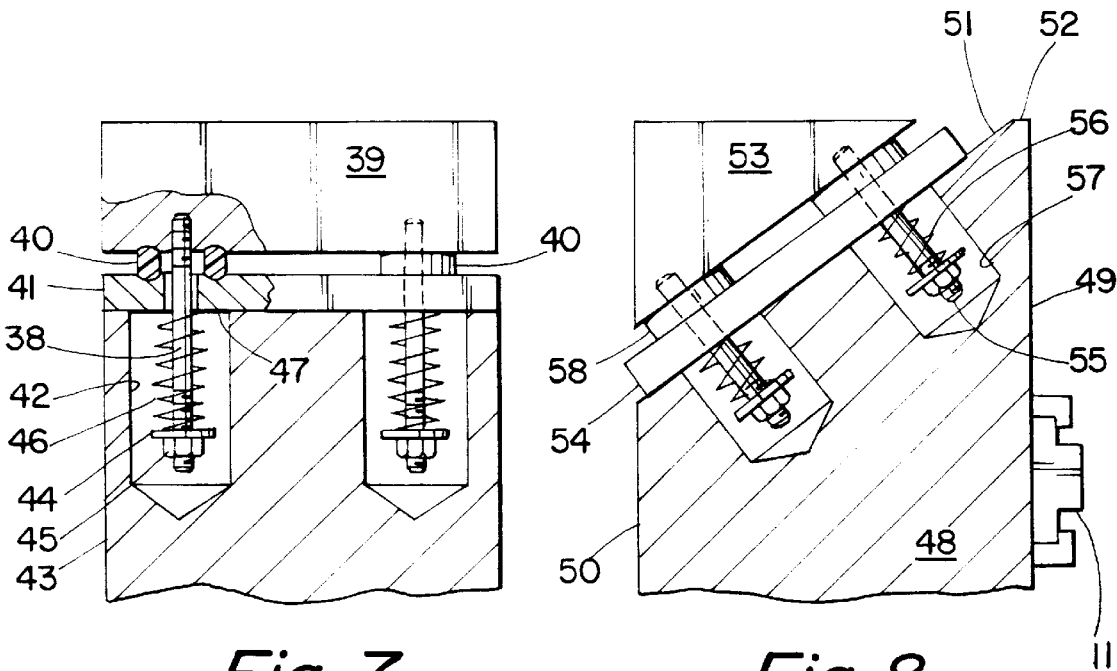
FIG. 7 is an elevational view of an alternative embodiment of the invention, depicting a damped tombstone fixture having an overhead damper mass.
FIG. 8 is an elevational view of an alternative embodiment of the invention, depicting a mitered tombstone fixture.

In the arrangement shown in FIGS. 3, 4, and 5, the damper mass 28 is located entirely within the hollow tooling column 24. An alternative embodiment is depicted in FIG. 6, wherein the damper components of FIGS. 3–5 have been inverted, and the damper mass 28 is located above the damper base 27, on the tombstone fixture 27. Another alternative embodiment, similar to that of FIG. 6, but having a different preloading spring arrangement, is depicted in FIG. 7, wherein the preloading screws comprise threaded studs 38 which are affixed to the bottom of a damper mass 39, and which extend downwardly through the damping elements 40 and damper base 41, and into clearance counterbores 42 within a solid tooling column 43. The stud 38 has a lowermost washer 44 adjacent a lock nut 45, and a helical compression spring 46 is mounted between the lower face 47 of the damper base 41 and the washer 44. In this arrangement, the damper mass 39 tends to be maximized.

FIG. 8 shows another alternative embodiment, wherein a tombstone fixture 48 has a vertical side face 49 for supporting a workpiece 11 for machining operations, and a tooling column 50 has a mitered surface 51, i.e., a surface angled with respect to the horizontal top surface 52 of the fixture 48. Here, a damping structure similar to that depicted in FIG. 6 is employed, but wherein the damper mass 53 has a triangular cross-sectional shape. The plate-like damper base 54 is mounted to the slanted surface 51, and the preloading screws 55 and springs 56 extend into individual clearance bores 57 within the solid tooling column 50. In this application, mass also tends to be maximized. Because of element preloading in the direction normal to the angled surface 51, the damper mass 53 moves parallel to the angled surface 51 as the damping elements 58 are principally worked in shear, and the damper is thus effective to absorb vibrations having X and Y components. It is again noted that principal vibrations of a tombstone fixture in the horizontal machining center of FIG. 2 are expected be seen in the horizontal plane or X direction, and generally at the top. Therefore, a damper of the construction shown in FIG. 8, for providing shear components in X and Y directions, would often be formed with a fairly shallow angle, with respect to the horizontal.

Figure 9:
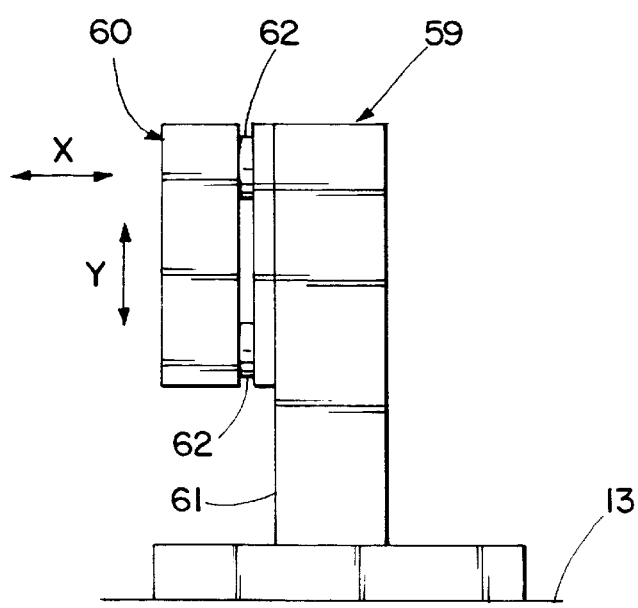
FIG. 9 is an elevational view of an alternative embodiment of the invention, depicting a T-type tombstone fixture with a face-mounted damper unit.

The ring-like damping element 29, detailed in FIGS. 4 and 5, is intended to primarily damp the fixture 23 through horizontal, or X direction, shearing movement of the damper mass 28 relative to the damper base 27 and tooling column 24. Those skilled in the art will, however, appreciate that the element has some inherent ability to attenuate vibrations in all directions, including the direction of preload. This inherent characteristic is employed in another alternative embodiment of the invention, FIG. 9; this elevational view depicts a T-type tombstone fixture 59 with a damper unit 60 substantially according to that of FIG. 6, mounted to its rear vertical face 61, to achieve a compact assembly. Principal vibrations are seen in a horizontal direction, at the top of the fixture 59, but the damping elements 62 of the vertically-mounted damper unit 60 are selected to primarily damp the principal vibrations in the direction of element preload (i.e., normal to the face 61), rather than in shear.

Those skilled in the art will also appreciate that a tombstone fixture may be mounted, for example, to a right angle attachment (not shown), such that the tooling column extends horizontally, in a cantilever fashion; when so mounted, it is expected that the main vibratory motion at the free end of the fixture will then be along a vertical plane, and the principles set forth in the preferred and alternative embodiments herein will still apply.

While the invention has been shown in connection with a preferred embodiment, it is not intended that the invention be so limited; rather, the invention extends to all such designs and modifications as come within the scope of the appended claims.

What is claimed is:

1. A tombstone fixture, for use in a machine for performing operations on a workpiece, comprising: a tooling column having a plurality of sides extending from a bottom portion to a top portion; means for mounting and securing said bottom portion to a machine tool support member; means for mounting a workpiece to at least one of said sides; and damper means secured to said tooling column for attenuating vibrations resulting from an operation on said workpiece.

2. A tombstone fixture in accordance with claim 1, wherein said damper means is secured proximal said top portion.

3. A tombstone fixture in accordance with claim 2, wherein said damper means comprises a tuned damper.

4. A tombstone fixture, for use in a machine for performing operations on a workpiece, comprising: a hollow vertical tooling column having a plurality of vertical sides extending from a bottom portion to a top portion; means for mounting and securing said bottom portion to a machine tool support member; means for mounting a workpiece to at least one of said sides; and damper means secured to said hollow tooling column, and extending at least partially within said top portion, for attenuating vibrations resulting from an operation on said workpiece.

5. A tombstone fixture in accordance with claim 4, wherein said damper means comprises a tuned damper.

6. A tombstone fixture, for use in a machine for performing operations on a workpiece, comprising: a tooling column having a fixture base and a plurality of sides extending from said fixture base; a damper base secured to said tooling column; a damper mass; at least one viscoelastic damping element interposed between said damper base and said damper mass; and resilient means for preloading said viscoelastic damping element and mounting said damper mass in relation to said damper base and tooling column.

7. A tombstone fixture in accordance with claim 6, wherein said resilient means includes attachment means for connecting said resilient means to said damper mass.

8. A tombstone fixture in accordance with claim 6, wherein said resilient means includes spring means mounted substantially without the outline of said damper mass.

9. A tombstone fixture in accordance with claim 6, wherein said damper base is secured proximal a top portion of said tooling column.

10. A tombstone fixture in accordance with claim 4, wherein said damper means comprises: a damper base secured to said tooling column; a damper mass; at least one viscoelastic damping element interposed between said damper base and said damper mass; and resilient means for preloading said viscoelastic damping element and mounting said damper mass in relation to said damper base and tooling column.

\* \* \* \* \*